United States Patent [19]
Kobale et al.

[11] 4,066,337
[45] Jan. 3, 1978

[54] DISPLAY SYSTEM INCORPORATING A LIQUID CRYSTAL

[75] Inventors: Manfred Kobale, Faistenhaar; Hans Krüeger, Munich; Hans-Peter Lorenz, Feldkirchen, all of Germany

[73] Assignee: Siemens Aktiengesellschaft, Berlin & Munich, Germany

[21] Appl. No.: 736,957

[22] Filed: Oct. 29, 1976

[30] Foreign Application Priority Data
Oct. 31, 1975 Germany .............................. 2548895

[51] Int. Cl.$^2$ ................................................ G02F 1/13
[52] U.S. Cl. ................ 350/160 LC; 350/320; 428/1
[58] Field of Search ............... 350/160 LC, 320; 428/1

[56] References Cited
U.S. PATENT DOCUMENTS
3,967,883  7/1976  Meyerhofer et al. ......... 350/160 LC Primary Examiner—Edward S. Bauer
Attorney, Agent, or Firm—Hill, Gross, Simpson, Van Santen, Steadman, Chiara & Simpson

[57] ABSTRACT

A liquid crystal type display system containing a liquid crystal layer with positive dielectric anisotropy located between two carrier plates whose mutually opposite surfaces each have an electrode coating as well as an insulation layer which has been vaporized on obliquely. A rotating display cell with obliquely vaporized-on layers is provided by choosing the vapor deposition angle for one of these layers in excess of about 75° and for the other layer less than about 65° and positioning the carrier plates in spaced relationship to one another without any substantial rotating of one plate relative to the other thereof.

23 Claims, 2 Drawing Figures

DISPLAY SYSTEM INCORPORATING A LIQUID CRYSTAL

BACKGROUND OF THE INVENTION

A display of the kind known to the prior art is disclosed in U.S. Pat. No. 3,834,792.

A rotating cell using a liquid crystal only has uniformly high contrast over the entire area, plus a uniform response characteristic, if its liquid crystal layer is rotated at all points through exactly 90° by the interfaces. It is true that by oblique vapor deposition on the carrier plates, it is possible, to produce surfaces having a high, reproducible orientating power, but it has not previously been possible also to produce a regular liquid crystal structure, which rotating cells need, over the larger areas needed for many applications. This is due primarily to the fact that vapor deposition normally has to be performed from point-like sources. Because of the very geometry of such a deposition arrangement, a layer grows on a substrate which has an oblique vapor deposition angle relative to the source in a manner which varies in magnitude from point to point, and, more especially, varies in direction.

If, as is usual, the two carrier plates used in a display system are assembled together to form a display system so that these plates are rotated through 90° in relation to one another, then virtually at every point on the screen there are areas in the respective vapor deposited layers on these plates which are located opposite one other and which have dissimilar structural deviations. This circumstance then leads to an angle of rotation varying from 90°, or even, as in the case of a direction of rotation which is not unambiguously preferred, to orientation disturbances with consequent local incursions into the contrast pattern.

Uniform orientation can be achieved not only by oblique vapor deposition, but also by rubbing the carrier plates with a suitable cloth. This last indicated kind of mechanical surface treatment, however, even if it is carried out most carefully, inherently does not yield reproducible and truly uniform orientations. In relation to the kinds of orientation techniques nowadays being used, this technique in receding steadily into the past.

BRIEF SUMMARY OF THE INVENTION

In order to overcome the deficiencies outlined above, in a liquid cyrstal type display system such as above indicated, there is provided, in accordance with the present invention, a pair of carrier plates each one of which is vapor coated at respective preselected vapor deposition angles with an insulative coating. Thus, in the case of the obliquely vapor-coated layer on one carrier plate, the angle between normals to the plate and the direction of vapor deposition (termed the oblique vapor deposition angle $\alpha_1$) has a value in excess of about 75°, while, in the case of the obliquely vapor deposited layer on the other carrier plate, the angle (termed the oblique vapor deposition angle $\alpha_2$) has a value less than about 65°. These respective vapor deposition angles are located in planes which are in spaced, approximately parallel relationship to one another. Preferably, $\alpha_1$ is between about 80° and 89°, and $\alpha_2$ is between about 60° and 40°. The most preferred values are obtained when $\alpha_1$ is about 85° and $\alpha_2$ is just less than about 60° and between about 55° and 60°. By way of material for each such layer, silicon oxide has, in particular, been found to be suitable and is presently preferred.

Other and further objects, aims, purposes, features, applications, advantages and the like will be apparent to those skilled in the art from the present specification taken with the accompanying drawings.

BRIEF DESCRIPTION OF THE DRAWINGS

In the drawings:

FIG. 1 is a cross sectional view showing an embodiment of a liquid crystal display system in accordance with the present invention; and FIG. 2 illustrates diagrammatically the arrangement of the carrier plates during the oblique vapor deposition process employed in fabricating the embodiment of FIG. 1 in accord with the present invention.

DETAILED DESCRIPTION

This invention utilizes the following known observations: If the angle of oblique vapor deposition is reduced to a value of less than about 65°, then the molecules no longer align themselves in a vapor deposition plane which is defined by the direction of oblique vapor deposition and the normal to the plate, but instead align themselves perpendicularly to this plane. Electron microscopi investigations have shown that this initially surprising molecular orientation is due to faults or discontinuities which run transversely to the direction of oblique vapor deposition through the entire deposited layer. Such a molecular orientation apparently only occurs below a specific oblique vapor deposition angle. It is possible that increasing material stresses lead to shear processes and to the observed distortions.

The orientation phenomenon above outlined makes it possible to build rotating cells in which the two carrier plates are no longer rotated in relation to one another but instead are coated at respective differing oblique vapor deposition angles. This substitution facility is particularly valuable because, where the two carrier plates are concerned, it is also possible to find positions relative to the vapor deposition source in which at least those components of the composition being deposited at the respective vapor deposition angles in the planes of the two substrates have the same positional dependence. This spatial uniformity of distribution, as those skilled in the art will readily appreciate, is adequate and indeed necessary in order that, despite the occurrence of incompletely uniform wall orientations, the angles of rotation can nevertheless be exactly 90° at any point on the screen. This result is obtained if the interval relationship $d_1 \sin \alpha_1 = d_2 \sin \alpha_2$ is adhered to (where $d_1$ and $d_2$ are the intervals from the vapor deposition source to corresponding points on the respective two plates). This equation states that the projections of the distance vectors $d_1$, $d_2$ on the planes of the particular substrates should be the same. Here, different positional functions on the mutually opposite plates of the display are entirely permissible, where the components of the vapor desposition angles along the respective normals to the plates, and therefore where the magnitudes of the respective angles of vapor deposition are concerned. Differences of this kind have no influence upon the angles of rotation.

The invention will now be explained making reference to an embodiment in association with the Figures of the drawings. Corresponding parts in the different drawings have been given the same reference numerals.

Figures 1, 2:
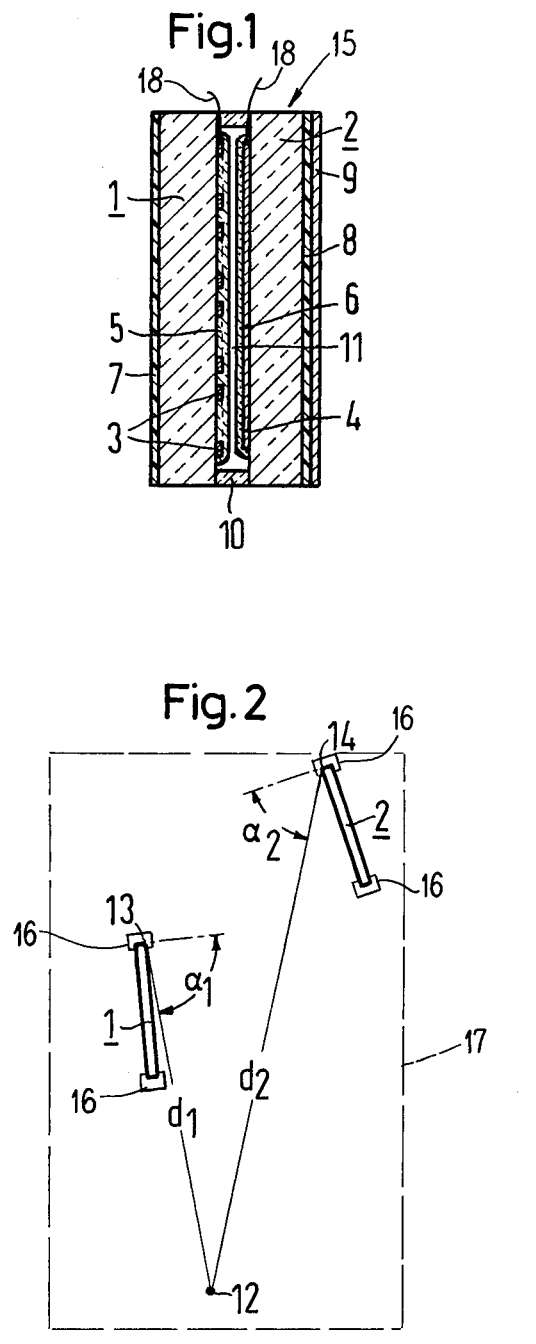

Detailed elements not essential to an understanding of the invention, for example, fixing elements and vessels in FIG. 2, have been omitted from the drawings in order not to overburden them.

The embodiment shown in FIG. 1 is a four-place alpha-numerical display system which is designated in its entirety by the numeral 15 and which operates by reflection. The display system 15, considered in detail, comprises two spaced parallel rectangularly shaped carrier plates 1 and 2. Each plate has generally flat, generally parallel opposed faces. The plates 1 and 2 are provided on their respective mutually facing inner surfaces with electrode coatings. Thus, plate 1 is provided with a segmented front electrode 3 and plate 2 is provided with a continuous back electrode 4. In addition, each plate 1 and 2 is further provided with an obliquely vapor deposited layer 5 and 6 respectively which overlies the electrodes 3 and 4, respectively. On the external outer opposed surfaces of the respective plates 1 and 2 a polarizor 7 and 8 is applied. Each polarizor 7 and 8 is oriented so as to be perpendicular to the other thereof. Rear polarizor 8, considered in the direction of viewing, is additionally covered by a reflector 9. The two plates 1 and 2 are hermetically sealed together peripherally at their rim zones by means of a frame member 10 which also acts as a spacer. Into the chamber 11 which is defined between the plates 1 and 2 and the frame 10, a liquid crystal layer 11 is introduced through a filling aperture (not shown) in the frame 10, or, alternatively, in one of the carrier plates 1 or 2. After filling, the aperture is sealed off, and chamber 11 is completely isolated from the environment.

The display system 15 components consist of the following materials: The carrier plates 1 and 2 are comprised of glass, the electrodes 3 and 4 are comprised of $SnO_2$ or $In_2O_3$, the obliquely vapor deposited layers 5 and 6 are comprised of $SiO_2$, the polarizors 7 and 8 are comprised of stretched polyvinylalcohol film with incorporated iodides, the reflector 9 is comprised of a metallized foil, or a special synthetic polymeric foil such as a polyester film one face of which is vapor coated with aluminum, the glass frame 10 is comprised of a glass solder having a low melting point, and the liquid crystal layer 11 is comprised of one of the conventional and known nematic liquid crystal mixtures. Other and alternative materials may be used for construction of display system 15 without departing from the invention as those skilled in the art will readily appreciate. Further details of manufacture and operation are shown, for example, in the afore referenced U.S. Pat. No. 3,834,792 as well as in the article appearing in "Appl. Phys. Lett." 18 (1971), page 127 et seq.

In FIG. 2, the geometry of the carrier plates 1 and 2 of a display system 15 during the oblique vapor deposition of such two carrier plates 1 and 2 in accord with the present invention is illustrated schematically. During such a deposition, the two carrier plates 1 and 2 are positioned, as by holder clamps 16, in a chamber 17 so as to extend in respective planes which are disposed perpendicularly relative to plane of FIG. 2. Their respective distances from vapor deposition source 12, are $d_1$ and $d_2$ (here, for plates 1 and 2, respectively) and these distances are measured from respective rear upper reference points 13 and 14 of respective plates 1 and 2. These reference points 13 and 14 as well as the vapor deposition source 12 are positioned so as to be in the vapor deposition plane which corresponds to the plane of the drawing. The surfaces of plates 1 and 2 which are being coated are each tilted in relation to the respective distance lines $d_1$ and $d_2$ joining their reference points 13 and 14, and the vapor deposition source 12. In the case of carrier plate 1, the angle between the normal and the joining line $d_1$ constitutes the oblique vapor deposition angle $\alpha_1$ and is here about 85°, while, in the case of carrier plate 2, the corresponding angle $\alpha_2$ is here about 58°.

The following is a preferred relationship for the practice of this invention between the two distances $d_1$ and $d_2$:

$$d_1 \cdot \sin \alpha_1 = d_2 \cdot \sin \alpha_2. \qquad 1)$$

Preferably, a pair of rectangular carrier plates is employed, and the longer sides of respective rectangular carrier plates are preferably in each case disposed generally perpendicularly to the vapor deposition plane.

Those skilled in the art will appreciate that this invention is not limited to the embodiment illustrated. For example, display systems for other than alpha-numerical characters are possible, such as, for example, matrix display patterns. Many variations in display system device construction are possible, as those skilled in the art will appreciate. A given display system can be operated in a reflection mode instead of a transmission mode depending upon construction, and a given display system can be provided with a semi-transparent reflector layer. Furthermore, one of the two polarizor layers can be discarded and replaced in a given display system by the incorporation of dichroic dyes into the liquid crystal layer. Persons skilled in the art can vapor coat the two carrier plates in a single operation or in two separate operations.

Thus, in one aspect, this invention provides a display system which utilizes a pair of spaced, generally parallel carrier plates at least one of which is light transmissive. A pair of light transmissive electrode coatings are formed on such plates, each one being associated with a different one respective inner adjacent opposed surface portion of one of said carrier plates. One of these electrode coatings is segmented in a predetermined manner for character display purposes. In addition, a pair of light transmissive, electrically insulative coatings are formed, each one being associated with a different one respective inner adjacent opposed surface portion of one of said carrier plates. Each such insulative coating is located over an adjacent such electrode coating. Each one of said insulative coatings is vapor deposited at an oblique angle. Thus, one of such insulative coatings is deposited at an angle in excess of about 75°, the other at an angle less than about 65°, as explained.

Mounting means for sealing such carrier plates together in fixed relationship to one another are provided which also cooperate to define therebetween a chamber. A liquid crystal layer is placed in this chamber, and this liquid crystal layer is chosen so as to have positive dielectric anisotropy.

A pair of light transmissive light polarizing layers are incorporated into a display system in spaced, generally parallel relationship to one another. One such polarizing layer is adjacent the outside surface portions of one of said carrier plates. The other such polarizing layer either is adjacent the outside surface portions of the other of said carrier plates, or is integral with such liquid crystal layers. A light reflecting layer is located outermost on one side of a display system, but adjacent to the outside surface portions of one of said carrier plates, including first fastening means (such as a clear adhesive) maintaining said reflecting layer in such location. A pair of electrical leads 18 complete a display device, each lead being electrically associated with a different one of said electrode coatings. Both leads 18 extend into the environment from the interior region of said chamber through seals formed with frame 10.

In a preferred display system both of such carrier plates are substantially transparent to visible light and one electrode coating is so segmented as to define therein a pattern of alpha-numeric characters. Preferably, each of said polarizing layers is adjacent the outside surface portions of a different one of said carrier plates, and second fastening means (such as a clear adhesive) is provided to maintain such layers in their respective desired adjacent relationships to such carrier plates, and preferably the light reflecting layer is in contacting, adjacent relationship to one polarizing layer. Preferred display devices are of the reflective type.

In another aspect, this invention relates to a pair of light transmissive glass carrier plates adapted for use in such a display system which plates are constructed as above described.

In still another aspect, this invention relates to a method for making a pair of coated carrier plates adapted for incorporation into such a liquid crystal type display system. This method involves the first step of depositing on one face of each of a pair of carrier plates as by painting, printing, vapor deposition or the like a light transmissive electrode coating. One of these electrode coatings is segmented in a predetermined manner. Then, as a subsequent step, one deposits by vapor deposition on each so coated face a light transmissive, electrically insulative coating. One of these insulative coatings is made at a deposition angle in excess of about 75°, the other of said insulative coatings being made at a deposition angle of less than about 65°, as described above. Then, the resulting so first and secondly deposited carrier plates are positioned with said respective insulative coatings being in spaced, adjacent, generally parallel relationship to one another and without any substantial rotation of one said plate relative to the other thereof. Next, such plates are further sealed together peripherally with a chamber being defined therebetween.

This method is preferably carried out so that the oblique vapor depositions are carried out while maintaining the above indicated relationship between the following variables:

- $\alpha_1$ is the vapor deposition angle for one of said insulative coatings,
- $\alpha_2$ is the vapor deposition angle for the other of said insulative coatings,
- $a_1$ is the distance between the vapor deposition source and a rear reference point for that carrier plate on which said one insulative coating is being so deposited measured in the vapor deposition plane, and
- $a_2$ is the distance between the vapor deposition source and a rear reference point for that carrier plate on which said other insulative coating is being so deposited measured in said vapor deposition plane.

We claim:

1. An improved display system comprising:
   a. a pair of spaced generally parallel carrier plates at least one of which is light transmissive,
   b. a pair of light transmissive electrode coatings, each one being associated with a different one respective inner adjacent opposed surface portion of one of said carrier plates,
   c. a pair of light transmissive, electrically insulative coatings, each one being associated with a different one respective inner adjacent opposed surface portion of one of said carrier plates and located over its adjacent said electrode coating, each one of said insulative coatings having been vapor deposited at an oblique angle, one of said insulative coatings having been so deposited at an angle in excess of about 75°, the other of said insulative coatings having been so deposited at an angle less than about 65°,
   d. mounting means sealing said carrier plates together in fixed relationship to one another and cooperating to define therebetween a chamber,
   e. a liquid crystal layer in said chamber, said liquid crystal layer having positive dielectric anisotropy,
   f. said insulative coating orientating the neighboring molecules substantially parallel to said plates, the direction of orientation at one of said plates being substantially vertical to the direction of orientation at the other of said plates,
   g. a pair of electrical leads, each one being electrically associated with a different one of said electrode coatings and extending into the environment from said chamber.

2. The display system of claim 1 wherein both of said carrier plates are transparent to light.

3. The display system of claim 1 wherein said one electrode coating is so segmented as to define therein a pattern of alpha-numeric characters.

4. The display system of claim 1 wherein said one electrode coating is so segmented as to define therein a matrix display pattern.

5. The display system of claim 1 comprising two polarizing layers and wherein each of said polarizing layers is adjacent the outside surface portions of a different one of said carrier plates, and second fastening means is provided to maintain such layers in their respective adjacent relationships to such carrier plates.

6. The display system of claim 1 comprising a light reflecting layer and wherein said light reflecting layer is in contacting, adjacent relationship to one polarizing layer.

7. The display system of claim 1 wherein said carrier plates are each comprised of glass.

8. The display system of claim 1 wherein said electrode coatings are each comprised of a material selecred from the group consisting of $SnO_2$ and $In_2O_3$.

9. The display system of claim 1 wherein said insulative coatings are each comprised of $SiO_2$.

10. The display system of claim 1 wherein said mounting means includes a glass frame comprised of a low melting glass solder.

11. The display system of claim 1 wherein said liquid crystal layer is comprised of a nematic liquid crystal mixture.

12. The display system of claim 1 wherein said liquid crystal layer has incorporated thereinto at least one dichroic dye.

13. The display system of claim 1 wherein one of said insulative coatings is vapor deposited at a vapor deposition angle of from about 80° to 89° and the other of said insulative coatings is vapor deposited at a vapor deposition angle of from about 60° to 40°.

14. The display system of claim 1 wherein one of said insulative coatings is vapor deposited at a vapor deposition angle of about 85° and the other of said insulative coatings is vapor deposited at a vapor deposition angle from about 55° to 60°.

15. A pair of light transmissive glass carrier plates at least one of which is light transmissive, each said plate having a portion of one face thereof coated with a light transmissive electrode coating, one of said electrode coatings being segmented in a predetermined manner, each so electrode coated plate face further being coated with a different light transmissive, electrically insulative coating, one of said insulative coatings having been vapor deposited at a vapor deposition angle in excess of about 75°, the other of said insulative coatings having been vapor deposited at a vapor deposition angle less than about 65°.

16. The plates of claim 15 wherein the vapor deposition angle for one of said insulative coatings ranges from about 80° to 89° and the vapor deposition angle for the other of said insulative coatings ranges from about 60° to 40°.

17. The plates of claim 15 wherein the vapor deposition angle for one of said insulative coatings is about 85° and the vapor deposition angle for the other of said insulative coatings ranges from about 55° to 60°.

18. A method for making a pair of coated carrier plates adapted for incorporation into a liquid crystal type display system comprising the steps of
   a. vapor paint first depositing on one face of each of a pair of carrier plates at least one of which is light transmissive with a light transmissive electrode coating one of said electrode coatings being segmented in a predetermined manner, and then
   b. secondly depositing by vapor deposition on each so coated face a light transmissive, electrically insulative coating, one of said insulative coatings being made at a deposition angle in excess of about 75°, the other of said insulative coatings being made at a deposition angle of less than about 65°.

19. The method of claim 18 wherein the resulting so first and secondly deposited carrier plates are positioned with said respective insulative coatings being in spaced, adjacent, generally parallel relationship to one another and without any substantial rotation of one said plate relative to the other thereof, and said plates are further sealed together peripherally with a chamber being defined therebetween.

20. The method of claim 18 wherein the vapor deposition angle for one of said insulative coatings ranges from about 80° to 89°, and the vapor deposition angle for the other of said insulative coatings ranges from about 60° to 40°.

21. The method of claim 18 wherein the vapor deposition angle for one of said insulative coatings is about 85° and the vapor deposition angle for the other of said insulative coatings ranges from about 55° to 60°.

22. The method of claim 18 wherein said second depositing is carried out while maintaining the following relationship $$d_1 \cdot \sin \alpha_1 = d_2 \cdot \sin \alpha_2$$

where:
   $\alpha_1$ is the vapor deposition angle for one of said insulative coatings,
   $\alpha_2$ is the vapor deposition angle for the other of said insulative coatings,
   $a_1$ is the distance between the vapor deposition source and a rear reference point for that carrier plate on which said one insulative coating is being so deposited measured in the vapor deposition plane, and
   $a_2$ is the distance between the vapor deposition source and a rear reference point for that carrier plate on which said other insulative coating is being so deposited measured in said vapor deposition plane.

23. The method of claim 22 wherein said carrier plates are each (a) comprised of glass, (b) rectangular in shape, and (c) oriented spatially with a longer side thereof disposed generally perpendicularly to said vapor deposition plane.

* * * * *